J. W. KINNEY.
WATER MOTOR.
APPLICATION FILED NOV. 12, 1914.
1,156,692.
Patented Oct. 12, 1915.
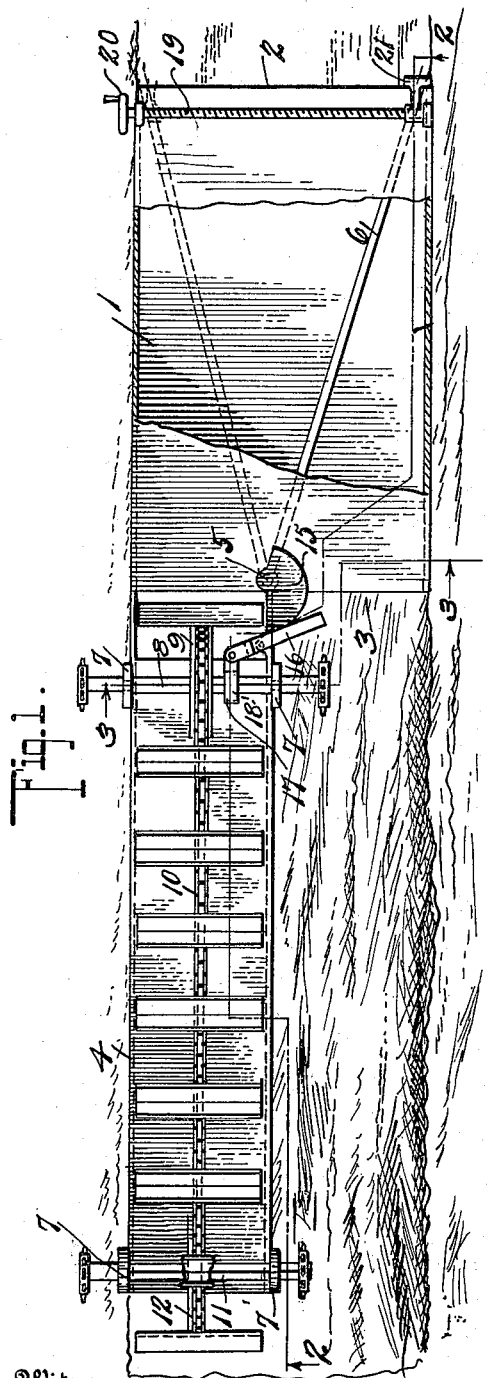
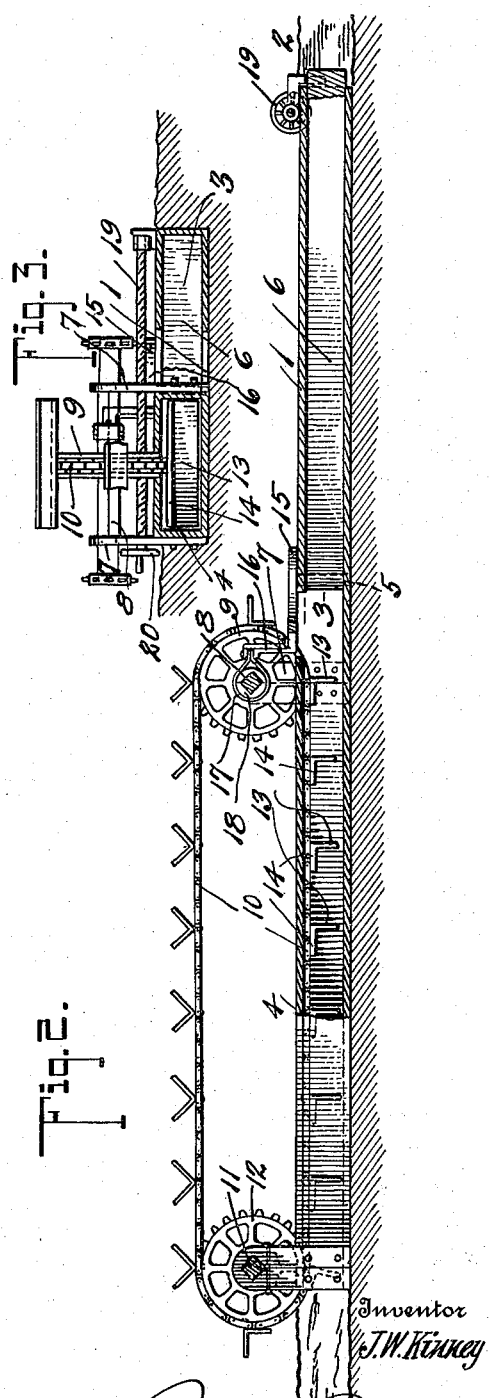
Witnesses
C. H. Wagner,
A. K. Whittington.
Inventor
J. W. Kinney
By Robb & Robb
Attorneys

UNITED STATES PATENT OFFICE.

JOSEPH W. KINNEY, OF GOLDCREEK, MONTANA.

WATER-MOTOR.

1,156,692.  Specification of Letters Patent.  Patented Oct. 12, 1915.

Application filed November 12, 1914. Serial No. 871,772.

*To all whom it may concern:*

Be it known that I, JOSEPH W. KINNEY, a citizen of the United States, residing at Goldcreek, in the county of Powell and State of Montana, have invented certain new and useful Improvements in Water-Motors, of which the following is a specification.

The present invention relates to improvements in water motors and its main object is to provide an apparatus of this character which is not only simple in construction but of such a nature as to render it most easily portable and susceptible of generating power when interposed in a current of water even though the fall of such water may be quite insignificant.

The essence of the invention lies in the provision of a receptacle having a mouth at one end and communicating with a paddle conduit, said receptacle being provided with a gate for effectively controlling the passage of the water through said conduit and thereby the actuation of the power mechanism coöperating with the conduit.

Among the advantageous features of my device is the ability to stop or shut off the power very quickly in case of accidents while enabling the slow starting of the power mechanism to eliminate jerking or breaking of the driving parts.

A still further object of the device is to provide in coöperation with the gate hereinbefore mentioned braking mechanism adapted to control the movement of the power generating means and operable through the instrumentality of the gate as it controls passage of the water to the paddle conduit employed in my apparatus.

These and such other objects as may hereinafter appear are attained by the novel construction, combination and arrangement of parts to be hereinafter specifically described and claimed.

Reference will now be had to the accompanying drawings forming a part of this specification, wherein:—

Figure 1 is a plan view of an embodiment of my invention; Fig. 2 is a longitudinal sectional view on the line 2—2 of Fig. 1; and Fig. 3 is a transverse sectional view on the line 3—3 of Fig. 1.

Specifically describing the invention and referring to the drawing, the numeral 1 designates a box or suitable receptacle provided at one end with a mouth 2 to admit passage of fluid therethrough, the opposite end of the receptacle having an outlet opening 3 adjacent to which and communicating with the receptacle 1 is a paddle conduit 4. Pivotally mounted at 5 intermediate the outlet opening 3 and the entrance to the paddle conduit 4 is located a water gate 6, the free end of which gate is adapted to be swung from one side of the receptacle to the other, the sides of said receptacle limiting the swinging movement in an obvious manner.

As will be evident from the drawing, when the gate 6 is swung to one side water passing through the receptacle will be directed to the paddle conduit 4, whereas movement of said gate to the opposite position will direct the full supply of water from the receptacle through the outlet 3, such movement causing an immediate stoppage of water supply to said conduit serving advantageously as will be hereinafter more clearly pointed out. Journaled in the spaced standards 7 secured to the sides of the conduit 4 near its entrance is a transverse shaft 8 carrying centrally thereof a sprocket wheel 9 over which passes an endless chain or similar carrier 10 and in like manner adjacent to the opposite end of the conduit 4 a power shaft 11 is journaled in standards 7′, and said shaft 11 carries a sprocket 12 over which the chain 10 also travels. The chain just mentioned is provided at suitable intervals throughout its entire length with paddles which are angular in form so as to provide the paddle proper 13 and the bracing arm 14 intermediate which the said paddles are loosely connected to the chain. The angular formation of the paddles is desirable to best withstand the strains against them. The conduit, as will be observed from Fig. 1, is open at the top adjacent to its mouth so as to enable the passage of the paddles into said conduit where they are adapted to be acted upon by the water and hence to transmit motion to the shaft 11 which may be suitably provided with a pulley to enable power to be taken off from the apparatus.

In order to facilitate the prompt stoppage of the paddle chain or carrier as well as to provide for the slow and steady starting of the power mechanism I provide preferably braking means which coacts with one of the carrier shafts and which braking means is controlled by the gate simultaneously as said gate controls the influx or stoppage of the supply of water to the paddle conduit, as will now be described. Secured to the pivot 5 of the gate 6 is a cam wheel or member 15 eccentrically disposed and adapted to coöperate with the forward end of a lever 16 pivoted intermediate its length on the conduit 4 adjacent to the carrier shaft 8. The opposite end of said lever 16 is suitably connected to a brake band 17 adapted to act upon the drum 18 under actuation by the lever.

The operation of the device will be apparent from the foregoing description and it may be stated that when the gate is swung into a position which allows the water entering the receptacle 1 to pass into the conduit 4 the brake is gradually released in proportion to the extent of movement of the gate so that the water will gradually act upon the paddle chain and prevent jerking of the mechanism which is operatively connected thereto. On the other hand, as the gate 6 is swung into the opposite position where the water is caused to flow out of the opening 3 the cam member 15 acts upon the lever 16 to cause the same to gradually apply the brake so as to effect a gradual stoppage of the machinery which is being operated by the power mechanism.

The apparatus hereinbefore described is capable of being disposed in a stream of water at a very slight inclination and yet produce power in an obvious manner even where the fall of the water is very small, so long as the stream is a running stream. The construction may be of any suitable size dependent upon the power to be produced and the arrangement such that the apparatus is made quite readily portable as hereinbefore mentioned.

When the size of the device requires, mechanical means for operating the gate may be employed, such, for instance, as the screw shaft 19 arranged transversely of the receptacle 1 and having at one end a hand wheel 20 and connected to a threaded sleeve carried by the arm 21 fixed to the gate extremity as shown in Fig. 1.

I desire it to be understood that changes may be made in the details of construction and arrangement of parts without departing from the scope of this invention, such for example, as providing each of the shafts 8 and 11 with a driving sprocket at each end so as to enable the driving of four distinct machanes therefrom and from the machine shafts other machines may be driven, so that a plurality of such machines may be provided with power without utilizing a line shaft.

Having thus described the invention, what is claimed is:

1. In a water motor, the combination of a receptacle having an inlet opening at one end, a gate pivotally mounted at the opposite end of the receptacle approximately centrally of said end, a power conduit connected to the receptacle at one side and having its entrance between the pivot of the gate and one side of the receptacle, said receptacle having an outlet opening between the other side of the pivot from that above mentioned and the opposite side of the receptacle, said gate being movable on its pivot for coaction with the last mentioned side of the receptacle to permit passage of water through the power conduit aforesaid and when swung in the opposite direction to coact with the first mentioned side of the receptacle for interrupting passage of water through the conduit and directing said water through the outlet, and power instrumentalities arranged in the conduit for actuation by the water when passing therethrough.

2. In a water motor, the combination of a receptacle, a conduit communicating therewith, through which water from the receptacle is adapted to be directed, a gate controlling passage of water into the conduit, power mechanism coöperating with the conduit and adapted for actuation by water passing therethrough, brake means and means operable by the gate for controlling the actuation of the power mechanism by the brake means aforesaid.

3. In a water motor, the combination, with a receptacle, of a conduit communicating therewith through which water from the receptacle is adapted to be directed, a gate controlling the passage of water into the conduit, power mechanism adapted to be actuated by the water passing through said conduit, and brake means for controlling movement of the power mechanism operable by the gate in movement of the same for cutting off from or admitting water to the conduit aforesaid.

4. In a water motor, the combination with a receptacle through which water is adapted to pass, of power mechanism adapted to be operated by the water from the receptacle, a gate in said receptacle for controlling the actuation of said mechanism by the water, a brake controlling the operation of the mechanism aforesaid, and brake applying means intermediate the brake and the gate and adapted to be actuated by the latter.

5. In a water motor, the combination, with a receptacle through which water is adapted to pass, of power mechanism adapted to be operated by the water from the receptacle, a gate in said receptacle for controlling the actuation of said mechanism by the water, a brake controlling the operation of the mechanism aforesaid, and means carried by the gate for releasing the brake upon actuation of said mechanism by the water and applying the brake when the water is shut off from the mechanism.

6. In a water motor, the combination, with a receptacle through which water is adapted to pass, of power mechanism adapted to be operated by the water from the receptacle, a gate in said receptacle for controlling the actuation of said mechanism by the water, a brake controlling the operation of the mechanism aforesaid, a cam connected to the gate, means intermediate the cam and the brake and connected to the latter for operating the brake upon movement of said gate.

7. In a water motor, the combination, with a receptacle through which water is adapted to pass, of power mechanism adapted to be operated by the water from the receptacle, a gate in said receptacle for controlling the actuation of said mechanism by the water, a brake controlling the operation of the mechanism aforesaid, and brake applying means intermediate the brake and the gate and adapted to be actuated by the latter, said brake applying means comprising a lever connected at one end to the brake and having its free end disposed in the path of movement of said gate.

8. In a water motor, the combination of a receptacle having a mouth at one end and an outlet opening at the other end, a paddle conduit communicating with the receptacle adjacent to the outlet opening, a gate pivoted adjacent to the paddle conduit and adapted to swing at its free end from one side of the mouth of the receptacle to the other, an endless carrier on the paddle conduit, paddles carried by said carrier and adapted to be actuated by water passing through the conduit for transmitting motion to the carrier, shafts about which the carrier rotates, brake means carried by one of said shafts and including a lever, and a cam fixedly secured to the pivot of the gate and adapted to operate the lever aforesaid upon movement of the gate.

In testimony whereof I affix my signature in presence of two witnesses.

JOSEPH W. KINNEY.

Witnesses:
 JOHN T. HOGAN,
 FRED T. MAUNIX.

Copies of this patent may be obtained for five cents each, by addressing the "Commissioner of Patents, Washington, D. C."